United States Patent Office 3,218,382
Patented Nov. 16, 1965

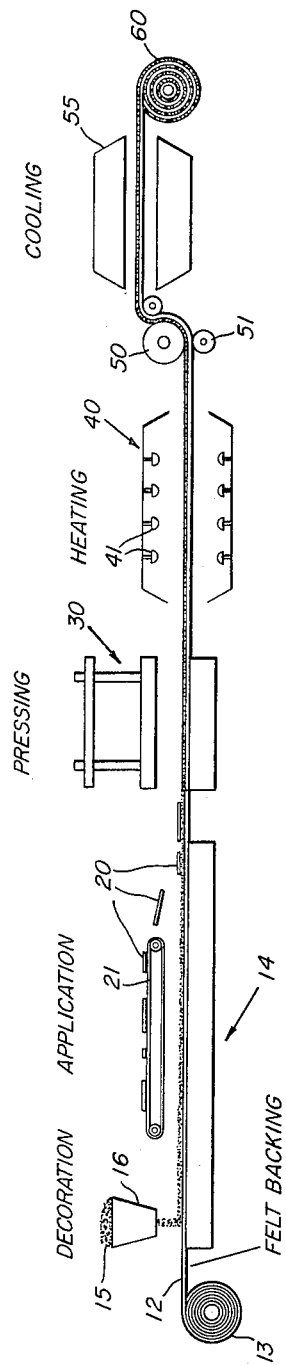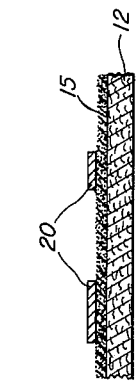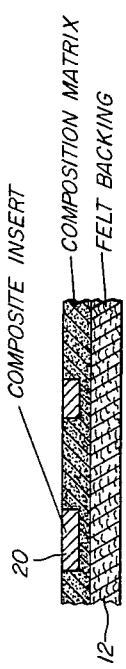

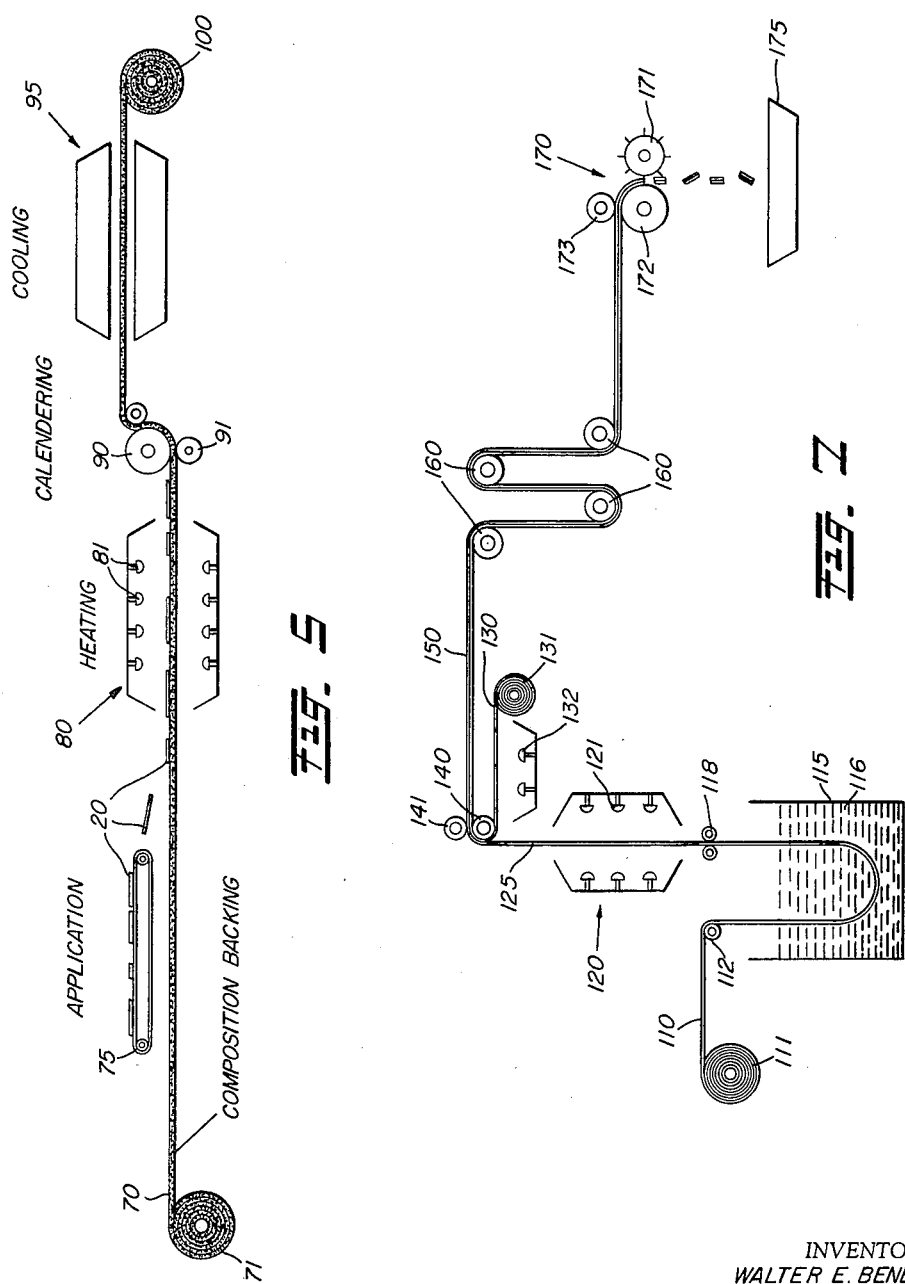

3,218,382
DECORATIVE SURFACE COVERING
Walter E. Benedict, Newtown, and Joseph F. Dobry, Langhorne, Pa., assignors to Congoleum-Nairn Inc., Kearny, N.J., a corporation of New York
Filed Jan. 14, 1960, Ser. No. 2,541
3 Claims. (Cl. 264—122)

This invention relates to composition sheets which are wear resistant and decorative and are adapted for utilization as smooth surface coverings for floors, walls and the like and to processes for their production.

Plastic composition material has been used very extensively for the decorative and wear-resistant layer of flexible, smooth surface coverings. Composition sheets usually are made adherent to a backing sheet such as bituminized felt or a fabric, but composition sheet material can be used by itself, e.g. in the form of tiles. Composition sheets for such purposes may be manufactured by sheeting out a substantially homogeneous mixture of binder material and filler to produce a sheet having substantially uniform color. Composition sheets having only a single color are most generally used in offices, stores, and other public buildings. However, for such purposes, as well as in the field of multiple or single dwellings, more decorative effects are frequently desired wherein more than one color is utilized.

Calendered sheets of composition material such as linoleum composition have been produced which are of variegated appearance by mixing together pieces of the composition material having different color and, while the mixed pieces are of a plastic and moldable consistency, subjecting them to one or more calendering operations under conditions which are suitably controlled for producing the appearance desired. For example, linoleum composition can be formed prior to calendering into pieces about ¾ to 1 inch in length and having a transverse dimension of about ¼ inch. Pieces of different color that have been so formed are mixed together until the relative proportion of the pieces of different color is about the same in all portions of the mixture. The mixture is then fed into a calender and during passage through the calender the pieces largely retain their individual colors but are subjected to very substantial distortional commingling. This distortional commingling is evidenced in the product of the first calendering by the fact that the pieces have become stretched out into long streaks to provide a striated effect that is commonly referred to as jaspe.

In addition to the jaspe effect, a simulated marble effect can be produced by further distortional commingling of the pieces of different color. This usually is accomplished by cutting a previously formed jaspe sheet into lengths, turning the lengths 90°, lapping the turned lengths and calendering the lapped lengths. The lapped jaspe sheets are then cross calendered, that is calendered in a direction 90° to the direction of the jaspe streaks, and by so doing the jaspe streaks are spread sidewardly with resultant production of an appearance resembling marble.

Variegated color effects likewise have been produced, particularly in connection with relatively heavy composition sheets, e.g. suitable for tiles, by initially forming by passage between rolls a sheet having substantially uniform color throughout and then, prior to further formation of the finished sheet depositing on the surface of the sheet pieces of contrasting color which may be of the character aforesaid and of essentially the same plastic consistency as that of the sheet to which they are added so that upon being subjected to calendering with the initially formed sheet, they become distortionally commingled therein while largely retaining their color, with resultant creation of a variegated appearance. In this procedure, the color elements are elongated but such elongation is substantially less than is obtained when producing a jaspe sheet as described above.

The variegated effect produced by carrying out operations of the type above referred to may be varied somewhat depending on such factors as the temperature of the rolls in relations to each other and the temperature of the composition material.

Coverings of the linoleum type have been made by depositing or inlaying pieces of different color and complementary shape onto a common backing sheet. The decorative effects produced in this way are of the geometric type, e.g. a checkerboard arrangement of square pieces of contrasting color or polygonal pieces of one or more color that are inlaid in corresponding cutouts from a continuous sheet of contrasting color so as to form a predetermined pattern. The production of coverings of the inlaid linoleum type involves the empolyment of a backing sheet such as bituminized felt on which pieces may be inlaid and the operation is one requiring the use of large and expensive equipment for cutting out the pieces from a plurality of calendered sheets of linoleum composition or the like, carrying the backing sheet of bituminized felt on a moving support, depositing the desired cutout portions or pieces of the calendered sheets on the backing sheet at different points of travel of the backing sheet, rejecting and taking away the unwanted portions or pieces of the calendered sheets, and finally merging or welding together the edges of the pieces that have been deposited on the backing sheet in interfitting inlaid relation. Because of the nature of the apparatus and method employed in making inlaid linoleum any changeover from one design to another requires very substantial and costly changes in equipment, the number of designs that may, as a practical matter, be placed on the market by a particular concern is very limited. It is also a drawback to the inlaying method that a serious salvage problem is presented by reason of the unwanted portions of the calendered sheet material that do not enter into the particular design being produced. For example, it not infrequently is the case that less than 10% of a calendered sheet having a particular coloration is required for entering into the intended design, the remaining 90% of the calendered sheet being essentially scrap. In many instances, the salvage of this scrap is inconvenient to arrange and problems of storage are encountered not only as regards storage space and handling expense but also as regards the limits of time that the composition may be stored without becoming unworkable. This type of equipment also is not adaptable to thermoplastic composition such as vinyl resin because of the temperature involved and the hardness of the composition.

Geometric type decorations have also been prepared in both linoleum and vinyl composition sheets by depositing granules of composition on the surface of a backing sheet such as bituminized felt by passing through stencils. Each different colored portion of the design requires a different stencil. After the backing sheet has been completely covered with granules, the sheet is pressed to consolidate it into a smooth surface covering. This type of procedure is quite effective in producing a wide range of geometric decorations without the problem of reusing wasted sections of pre-formed sheets. The products produced, however, do not have designs that are clearly defined at their edges since the size of the granules and method of application cause adjacent piles of different colored compositions to intermix or blend together. This blending is aggravated in many instances by the necessity of vibrating the sheet to form a layer of uniform thickness on the backing sheet.

Attempts have been made to produce geometric patterns by placing forms or decorative elements cut from a pre-formed composition sheet on the surface of a layer of granules and thereafter consolidating the elements and granules together to produce a sheet having the decorative elements imbedded in the surface of the sheet. It is usual and most common when using decorative elements, for the elements to become distorted during pressing. This is primarily due to the nature of the granular layer but is also due to the softening of the decorative elements during pressing when high temperatures are usually required. The granular layer unless it is composed of extremely fine granules is very rough and uneven. The degree of distortion of each decorative element, therefore, depends on the density and size of the granules beneath it. It is not uncommon in such procedure to have each decorative element distorted in a different way producing a completely unacceptable product.

Two methods are in commercial use for producing non-directional or geometric type of decorations in composition surface coverings by calendering procedure which do not involve the necessity of making cutouts in a base sheet. One of the methods is disclosed in U.S. Patent S.N. 2,888,975, issued on June 2, 1959 to W. E. Benedict, and involves the placing of flat pre-formed pieces of vinyl composition on the surface of a pre-formed vinyl composition sheet, heating the sheet and passing the sheet between calender rolls maintained at a temperature below the temperature of the sheet whereby the pieces are imbedded into the base sheet without substantial distortion. The second method for producing a non-directional type product is disclosed in U.S. Patent S.N. 2,880,464, issued on April 7, 1959 to W. E. Benedict and J. F. Dobry and involves the placing of pieces of linoleum composition and the like on the surface of a pre-formed sheet and passing the covered sheet through a calender while simultaneously forcing fine particles of composition beneath the sheet to compensate for the pieces and irregularities of the sheet. Both of these procedures are very effective for producing non-directional decorative composition surface coverings. Both processes, however, require careful control of operating conditions and in the latter process, continual presence of an operator to control the fine particles of composition.

An object of the invention is to produce a decorative composition surface covering having undistorted decorative elements in its surface.

Another object of the invention is to provide a composite decorative element which can be used for producing such products which enables the utilization of a wide range of processing conditions.

Another object of the invention is to provide a process for producing such a product which is readily adaptable to a wide variety of equipment and processing conditions.

A further object of the invention is to provide a process capable of producing novel surface coverings having a wide variety of decorations heretofore unobtainable.

Other objects and the advantages of the invention will appear hereinafter.

In accordance with the invention, a non-directional composition surface covering is produced by placing a composite decorative element on the surface of a layer of composition which can be in the form of a sheet or a granular layer and thereafter forming the components into a smooth surfaced sheet by the application of pressure.

The composite decorative element which is the essential element of the invention is formed by applying a thin layer of composition to the surfaces of a fabric and thereafter cutting the fabric into any desired geometric configuration. The fabric gives the design element high strength and particularly at elevated temperatures thereby resisting distortion during processing. In addition, by using transparent or translucent coatings, a decorative design can be woven into the fabric or printed on its surface. This latter procedure permits the formation of unlimited effects in the surface covering through the combination of the printed design and shape of the decorative element. The composition coating can either be formed by impregnating the fabric, coating the composition on the surface of the fabric or by laminating a pre-formed composition sheet to one or both surfaces of the fabric. It is necessary to have a coating on both sides of the fabric since the top surface gives wear resistance to the fabric while the bottom coating allows physical bond to the matrix. The presence of the fabric gives a higher tensile and tear resistance to the decorative element than can be otherwise obtained since it maintains its high strength even at greatly elevated temperature. This enables the application of the decorative element under high heat and pressure and while subjecting it to various strains without distorting the element.

The invention will be better understood from the following detailed description when read in conjunction with the drawings, wherein FIGURE 1 is a diagrammatic side elevation which is illustrative of one type of apparatus which can be used in the practice of the invention.

FIGURE 2 is a fragmentary cross-section, on a reduced scale, of the product of the invention at an intermediate stage of production prior to pressing.

FIGURE 3 is a plane view, on a reduced scale, of a flexible smooth surface covering which illustrates certain of the effects than can be produced according to certain embodiments of the invention.

FIGURE 4 is a fragmentary cross-section, on a reduced scale, of a flexible smooth surface covering produced in accordance with the invention.

FIGURE 5 is a diagrammatic side elevation which illustrates a second type of apparatus which can be used in the practice of the invention.

FIGURE 6 is a fragmentary cross-section, on a reduced scale, of a flexible surface covering produced by the process illustrated in FIGURE 5.

FIGURE 7 is a diagrammatic side elevation which illustrates a method for forming the decorative design element of the invention.

Referring to FIGURE 1, a method is shown for producing a smooth composition surface covering by depositing small granules of composition on the surface of a backing sheet, such as an impregnated flooring felt, placing the composite decorative elements on the surface of the granules at spaced intervals and thereafter pressing the granules and composite decorative elements together to form a smooth uniform sheet bonded to the flooring felt.

The felt backing sheet 12 is fed from a supply roll 13 onto a flat bed or table generally indicated at 14. Composition granules 15 are deposited on the surface of the backing sheet from a hopper 16 in a smooth uniform layer. The composite decorative elements 20 are placed on the surface of the granules from a conveyor 21. The composite decorative elements 20 can be placed on the surface of the granules 15 in either random or geometric configuration. If a geometric configuration is desired, it is necessary to place the composite decorative elements 20 on the supply conveyor 21 in the desired geometric configuration. This can be done by automatic means (not shown) or by placing the decorative elements 20 by hand. The backing sheet 12 covered with the granules 15 and composite design elements 20 is fed to a press generally indicated at 30. The press is heated so that the granules and decorative elements become fused and welded into a uniform sheet. The granules apparently form around the decorative elements since the elements remain undistorted. It is highly desirable in certain instances to insert a sheet of paper between the press surface and the granules to prevent the composition from sticking to the pressing element. The use of such a paper sheet is disclosed in United States Patents No. 1,975,515, which issued on October 2, 1934 and No. 2,772,141, which issued on November 27, 1956. If desired, however, when utilizing a synthetic resin as a component of the composition, the granules can be a plastigel composition wherein the major portion of the synthetic resin in the composition is unfused and unplasticized. The use of such a composition eliminates the need for the paper sheet and permits consolidation of the granules and design elements at a temperature lower than fusion temperature of the composition. When using such a composition, however, it is necessary to pass the sheet to a fusion oven generally indicated at 40 which raises the temperature of the consolidated sheet to the fusion temperature of the composition. The fusion oven 40 can be any conventional type, such as a forced hot air oven or a bank of infrared heating lamps, such as indicated at 41. The fused sheet is thereafter passed to a planishing unit for smoothing the surface of the fused sheet which comprises a chrome plated roll 50 and a resilient back-up roll 51. The planishing unit can place any desired degree of gloss on the surface of the sheet or can be used as an embossing unit for embossing the sheet. The sheet is then cooled by any suitable means, such as a cooling chamber 55 or by passing over cooling cans or drums and is thereafter wound on a collecting roll 60.

An alternative procedure for producing surface coverings in accordance with the invention is shown in FIGURE 5 wherein a pre-formed composition sheet 70 is fed from a supply roll 71. The composition sheet can be of any desired thickness depending on the ultimate use of the product. In the case of floor covering, a sheet of from about 10 to about 50 mills is appropriate. The composite decorative elements 20 are deposited on the surface of the sheet in random or geometric configuration as described above from a conveyor 75. The pre-formed matrix sheet 70 with the composite decorative elements 20 on its surface is then heated to soften the matrix so that it is readily deformable by passage through an oven generally indicated at 80 which can be a bank of infrared heat lamps 81, a forced hot air oven or the like. The heated sheet is then passed between cold calender rolls 90 and 91 which press the composite decorative elements into the surface of the softened pre-formed sheet. The roll 90 presents a smooth rigid surface suitable for imparting the desired finish to the composite sheet. Thus the roll may be a chrome finish or it may a polished steel roll. Rolls of this type impart a high polish to the surface of the sheet. If a surface finish of any other type, such as a matt finish, is desired, then the roll 90 may be appropriate for the production of such finish. The roll 91 can be provided with a yieldable resilient material surface, for example, the layer on the surface of the roll can be about one inch in thickness and should be of material which can withstand high temperatures. A synthetic rubber material, such as chlorobutadiene, is particularly suitable for the purpose. It is necessary to keep the surface of the roll 90 at a temperature substantially below the temperature of the heated matrix sheet. It has been found desirable to maintain the surface temperature of the roll 90 at a temperature at least 50° F. and preferably at least 75° F. below the temperature of the matrix sheet. After the matrix sheet with the composite elements is passed between the calender rolls 90 and 91, it is preferred to carry the sheet on the surface of the roll 90 contacting its surface for a substantial distance so that it may be cooled to a temperature at which it can be readily stripped from the surface of the roll. The sheet is thereafter cooled by passing through a cooling chamber 95 or over cooling drums and wound on a collecting roll 100.

As indicated above, the essential part of the invention is the composite decorative element. One method for producing the composite decorative element is shown in FIGURE 7. A fabric 110 is fed from a supply roll 111. The fabric is woven in a plaid design of the Clan MacDonald. The fabric is passed over roll 112 into impregnating tank 115 which contains a liquid composition impregnant 116. The impregnated fabric is passed vertically out of the impregnating tank through squeeze rolls 118 which force the impregnant into the fabric and also serve to remove any excess impregnant on the surface of the fabric. The impregnated fabric 119 is then passed through a fusion oven generally indicated at 120 which can be a forced hot air oven or a series of infrared heat lamps 121. The oven is maintained at sufficiently high temperatures to cause fusion of the impregnant. A clear composition film 130 is fed from a supply roll 131. The film is passed over a bank of infrared heating lamps 132 which raises the temperature of the film to a tacky condition. The heated film is thereafter passed around a base roll 140 simultaneously with the passage of the fused heated fabric 125 and beneath a squeeze roll 141 which presses the heated fabric and heated film together against the base roll thereby bonding the sheets together. The film coated fabric 150 is cooled by any suitable means such as by passage over cooling cans 160 and then to a cutting apparatus generally indicated at 170 whereby the film covered fabric is cut into any desired geometric shape. The cutting apparatus illustrated comprises a cutting cylinder 171 and feed rolls 172 and 173. The cut pieces which form the composite decorative elements are collected in collecting hopper 175. As indicated above, as an alternate procedure to impregnating the fabric, a film can be laminated to both sides of the fabric. This can be accomplished in the same manner as described above for the one side lamination. In addition, the composition can be applied to the surface by any of the conventional coating operations, such as using a doctor blade for applying the coating.

The composition used for coating the surface of the fabric to form the composite decorative element, whether it be by impregnation, coating or lamination, is not critical to the invention. The only limitations on the composition coating is that the surface which contacts the matrix sheet must be compatible with the matrix composition. In certain instances if the respective compositions are not completely compatible, a second coating can be used in the nature of an adhesive to bind the composite decorative element and matrix together.

In the preferred embodiment of the invention, the composite decorative element is produced by coating, printing or otherwise decorating the fabric and thereafter applying a clear film to its surface. The composition coating on the fabric can be pigmented but much of the desirable decorative effect of the invention is lost if the coating on the fabric under the processing conditions is caused to flow thereby resulting in distortion of the decorative design element.

The thickness of the matrix whether it is granules or a pre-formed sheet and the thickness of the composite decorative elements depends upon the desired use for the surface covering. For example, in the production of a laminated covering comprising a decorative and wear resistant layer which is bonded to a backing sheet, such as bituminous felt, a typical wear layer is about 0.025 inch thick. On the other hand, heavier sheets can be produced if the surface covering is to be in the form of tiles without a backing and such sheets are usually about 0.040 to 0.250 inch thick.

The composite decorative elements which are pressed into the matrix sheet preferably are substantially thinner than the matrix sheet. As a general rule, the overall thickness should not exceed approximately seventy-five percent of the thickness of the matrix sheet. Unusually good results are obtained when the thickness of the composite decorative element is between one-half and one-eighth the thickness of the matrix sheet. In the case of consolidating the decorative elements with a layer of granules, the thickness referred to is the ultimate thickness of the final consolidated sheet. As a general rule, thicker pieces can be used in more readily deformable composition. The fabric utilized in producing the novel decorative design elements of this invention can be woven, knitted, braided or otherwise formed from any of the commercially available fibrous materials, typical of which are cotton, rayon, silk, wool, hemp, jute, flax, protein fibers, mineral fibers such as glass, polyamides such as nylon, acrylic fibers, polypropylene and the like. It is essential for the fabric to have substantial tensile strength at the high temperature required for consolidating the composite decorative element into the matrix. Instead of utilizing a woven fabric, the fabric can be of the non-woven variety where fibers are deposited from an aqueous slurry or by other means onto a surface to form a web which can be impregnated to increase its strength. It is essential, however, that the fabric have a minimum tensile strength of at least about 3,000 pounds per square inch, and preferably 5,000 pounds per square inch, at the processing temperature required in order to prevent distortion of the decorative element. The thickness of the fabric can vary but such thickness determines the maximum thickness which can be used for the composition coatings. It is desirable if the surface covering is to be subjected to an appreciable amount of wear as is the case with a floor covering, for the top coating on the fabric to be at least 0.003 inch in thickness.

The size or flat dimension of the composite decorative element can vary widely but generally four to six inches on a side is the maximum that should be used since it becomes difficult to process large sizes using conventional pressing and calendering equipment. A size of three square inches maximum is preferred. If the element is hollow as having a piece cut out of its center, larger elements can be used. It should be understood that the composite decorative elements are preferably applied in spaced relationship to the surface of the matrix, i.e. separated from one another.

The composition can be any of the wide range of materials which are used for surface coverings. Such compositions usually comprise a binder and pigments and fillers. The binder is made up of one or more resinous materials and plasticizers therefor. In addition, light and heat stabilizers as well as lubricants and the like can be added. The composition, of course, must be thermoplastic or softenable by heat at the time of processing. The most desirable procedure is to use the same composition for both the matrix and the composite decorative element since there need be no concern about compatibility. When using matrix compositions which are opaque, such as linoleum, it is necessary to use other compositions for coating the fabric if it is desired to have the fabric visible. Typical of the compositions which can be utilized are linoleum, rubber and natural and synthetic resinous material. Vinyl compositions are particularly effective for application to the fabric for forming the composite decorative elements since such components can be compatible with a large range of other compositions.

Typical linoleum compositions are composed of siccative oil, resins, fillers and pigments. The siccative oil can be linseed, tall, perilla, or any oil which upon oxidation allows a substantial amount to oxidize glycerides of linolic and/or linolenic acids in fluid phase. The resin can be rosin, ester gum, fused congo, congo ester kouri gum or the like. The filler can be ground cork, wood flour, whiting, china clay, asbestine or the like.

Typical linoleum formulations contain from about 25 to about 50 percent linoleum cement, about 25 to 35 percent vegetable filler and about 25 to about 40 percent mineral filler. The linoleum composition is formed by mixing the siccative oil and resin and oxidizing the mixture while heating. When the linoleum cement has been properly oxidized and aged, it is mixed with a filler and pigment and calendered into a sheet. The initial sheet forming of linoleum is usually between two rolls, the top roll being maintained at a temperature of less than about 100° F. and the bottom roll at a temperature between 200° F. to 250° F. The rolls usually exert a pressure of about 1500 to about 2500 lbs. per linear inch on the composition. The calender roll contacting the surface of the sheet is usually maintained at a substantially lower temperature than the roll contacting the back of the sheet. This initial sheet can be formed into granules or re-calendered prior to use. After processing, it is necessary to cure the sheet by maintaining it at a temperature of about 180° F. for a period of several weeks. Linoleum compositions can be classified as a thermoplastic material since during the period of initial sheet formation, it has all the characteristics of a thermoplastic sheet and it is not until subsequent aging that it assumes its thermoset properties.

A wide range of surface coverings are presently prepared by utilizing a composition containing a thermoplastic synthetic resin. Such compositions contain resins, plasticizers, fillers, pigments, stabilizers, lubricants and the like. As indicated above, vinyl resins are preferred and can be formed by polymerizing a vinyl monomer with itself or other monomers. The vinyl resins most widely used in floor coverings are polyvinyl chloride resins which can be the straight monomer or can be formed by copolymerizing with other monomers, and particularly vinyl acetate, wherein the resin contains about 80 to 98 percent vinyl chloride. Resins of this type which are particularly useful are thermoplastic resins having a softening point above about 150° F. and a specific viscosity above about 0.17 as measured in a solution containing 0.20 grams of resin per 100 mls. of nitrobenzene at 20° C.

Copolymers of vinyl chloride with dibutyl maleate, ethyl acrylate, methyl acrylate, butyl acrylate, methylethyl acrylate, and butylmethyl acrylate all containing substantially the same amount of vinyl chloride and having the same viscosity as indicated above can be used. In addition, other copolymers of vinyl chloride are used, such as vinyl chloride and vinylidine chloride. Typical of other suitable resins are polyacrylonitrile, polymethylacetates, hydrocarbon resins, such as polybutylene and polyethylene and the like. Typical types of vinyl compositions which can be used in floor coverings are disclosed in United States Patent No. 2,558,378, issued on June 26, 1951 to Robert K. Petry.

Suitable plasticizers for the resins are: dioctyl phthalate, dibutyl phthalate, butyl benzyl phthalate, tricresyl phosphate, triphenyl phosphate, alkyd aryl phosphate, di-iso-octyl phthalate, dibutoxyethyl phthalate, polyester plasticizers of the oil modified alkyd type and resin types based on sebacic acid and related materials and the like.

Suitable fillers can be fibrous or non-fibrous or a combination of both. Typical of the fibrous fillers used are: asbestos, cork, wood flour, cellulose fibers, fibrous talc, animal fibers and the like. Non-fibrous fillers include calcium carbonate, calcium sulphate, barytes, blanc fixe, magnesium silicate, mica, clay and asbestine.

In order to form the composition, the components are usually mixed at their fusion point which generally ranges from about 300° F. to about 375° F. After a homogeneous mixture is obtained, the composition can be sheeted by passage through calender rolls maintained at a temperature at least 25° F. below the mixing temperature and, if granules are desired, the sheet can be broken up or otherwise disintegrated by any suitable means.

Compositions of rubber can also be used and such compositions usually contain either natural or synthetic rubber as a binder. The proportions of such compositions are similar to those for synthetic resinous compositions described above and the processing is carried out in a similar manner except that rubber compositions usually require a curing period to harden the composition.

The composition used for forming what is conventionally called "asphalt tile" can also be used. Such compositions usually contain blends of lead colored natural resins. The most commonly used resins are the para-coumarone indene resins having a melting point of above 135° F. A typical formulation contains about 15 to 35 percent resin, about 5 to 15 percent softening agents and the remainder fillers and pigments. Such a composition is usually mixed at a temperature between 250 and 300° F. and can be initially calendered between rolls maintained at a temperature less than 230° F.

Typical formulas for compositions utilized for surface coverings are as follows:

EXAMPLE 1

| | Parts |
|---|---|
| Paracoumarone indene resin | 21 |
| Cottonseed pitch | 14 |
| Asbestos medium fiber | 45 |
| Asbestine | 10 |
| Floated silica | 5 |
| Color pigment | 5 |

EXAMPLE 2

| | Parts |
|---|---|
| Linseed gel | 66.0 |
| Chlorinated paraffin (70% chlorine) | 46.4 |
| Chlorinated paraffin (42% chlorine) | 19.7 |
| Antimony oxide | 100 |
| Asbestos | 116 |
| Magnesium silicate | 80 |
| Color pigment | 45.0 |
| Lead phosphite | 3.5 |
| Manganese resinate | 0.04 |
| Zinc oxide | 0.5 |

EXAMPLE 3

| | Parts |
|---|---|
| Linseed gel | 37.0 |
| Chlorinated paraffin (70% chlorine) | 48.0 |
| Antimony oxide | 54.0 |
| Magnesium silicate | 150.0 |
| Barium sulphate | 54.0 |
| Vinyl chloride-vinyl acetate copolymer | 40 |
| Di-octyl phthalate | 60 |
| Color pigment | 27 |
| Lead phosphite | 4.5 |
| Zinc oxide | 1.12 |
| Manganese resinate | 0.03 |

EXAMPLE 4

| | Parts |
|---|---|
| Linseed gel | 45.0 |
| Chlorinated paraffin (75% chlorine) | 48.0 |
| Vinyl chloride-vinyl acetate copolymer | 40.0 |
| Tricresyl phosphate | 40.0 |
| Lead phosphite | 5.0 |
| Antimony oxide | 54.0 |
| Magnesium silicate | 214.0 |
| Color pigment | 27.0 |
| Zinc oxide | 1.35 |
| Manganese resinate | 0.03 |

EXAMPLE 5

| | Parts |
|---|---|
| Vinyl resin-siccative oil gel (1 to 1) | 114.5 |
| Antimony oxide | 52-156 |
| Asbestos | 55 |
| Aluminium silicate | 268.5-164.5 |
| Color pigment | 30.0 |
| Zinc oxide | 0.4 |
| Manganese resinate | 0.03 |
| Lead phosphite | 3.0 |

EXAMPLE 6

| | Parts |
|---|---|
| Vinyl chloride-vinyl acetate copolymer | 84 |
| Dioctyl phthalate | 40 |
| Calcium carbonate | 100 |
| Asbestos | 147 |
| Color pigment | 20 |
| Stabilizer | 8 |
| Stearic acid | 1 |

EXAMPLE 7

| | Parts |
|---|---|
| Vinyl chloride vinyl acetate copolymer | 100 |
| Asbestos | 125 |
| Calcium carbonate | 120 |
| Color pigment | 10 |
| Dibutyl phthalate | 10 |
| Butylbenzyl phthalate | 15 |
| Stabilizer | 10 |
| Stearic acid | 1 |

EXAMPLE 8

| | Parts |
|---|---|
| Polyvinyl chloride | 100 |
| Tricresyl phosphate | 25 |
| Butylbenzyl phthalate | 23 |
| Asbestos | 100 |
| Calcium carbonate | 250 |
| Color pigment | 20 |
| Stabilizer | 5 |
| Stearic acid | .5 |

Typical procedures for producing the composite decorative elements are as follows:

*Example A*

A cotton cloth of about 80 count is printed on one side with a design utilizing polyvinyl chloride printing inks. The printing is dried and the printed fabric is impregnated by dipping into an impregnant having the following composition:

| | Parts |
|---|---|
| Vinylchloride-vinyl acetate copolymer having free hydroxy groups | 100 |
| Toluene | 200 |
| Methyl ethyl ketone | 200 |
| Epoxidized soya bean oil | 5 |
| Urea formaldehyde resin | 8 |
| Stabilizer | 2 |

The cotton fabric is then heated to 220° F. to dry the composition, leaving a fabric of approximately three times its original weight. The thickness of the impregnated fabric is approximately 0.015 inch. The fabric is then cut into diamond shapes having an area of approximately five square inches.

*Example B*

A cotton cloth of about 80 count is printed on one side with a design utilizing polyvinyl chloride printing inks. The printing is dried and the printed fabric is impregnated by dipping into an impregnating bath having the following composition:

| | Parts |
|---|---|
| Polyvinyl chloride paste resin | 100 |
| Dioctyl phthalate | 16 |
| Tricresyl phosphate | 8 |
| Epoxidized soyabean oil | 5 |
| Mineral spirits | 20 |
| Stabilizers | 3 |

The cotton fabric is then dried and heated to 350° F. to fuse the resin, leaving a fabric of approximately three times its original weight. The thickness of the impregnated fabric is approximately 0.015 inch. A clear plasticized vinyl chloride film of approximately 0.006 inch thickness is then heated on one side to 300° F. to soften the film and laminated to the heated impregnated fabric by passage between laminating rolls. The fabric is then cut into rings or 4 inches Outside Diameter and 3½ inches Inside Diameter.

The following examples illustrate methods for produc-

EXAMPLE I

Conventional linoleum composition is formed containing 37.9 percent binder which contains blown and polymerized linseed oil and a small portion of rosin, 27.5 percent wood flour, 25.7 percent calcium carbonate and 9.6 percent pigments and calendered to form a sheet about 0.050 inch in thickness. The sheet at a temperature of about 100° F. is passed under a distributing mechanism which deposits the composite decorative elements formed in Example A on the surface of the linoleum sheet at intervals of 18 inches. The sheet is then passed through a two-roll calender having a face roll maintained at 100° F. and a back roll at 220° F. whereby the composite decorative elements are pressed into the surface of the sheet and the thickness of the sheet is reduced to about 0.036 inch. The sheet is then laminated to an asphalt saturated flooring felt and subjected to the conventional curing at 160° F. for a period of four and one-half weeks. The finished sheet has a smooth surface wherein the composite decorative elements are imbedded to a depth of about two-thirds the thickness of the sheet.

EXAMPLE II

The following composition is charged into a Banbury mixer and blended at approximately 350° F. for a period of three minutes:

| | Parts |
|---|---|
| Polyvinyl chloride | 100 |
| Dioctyl phthalate | 15 |
| Dipropylene glycol dibenzoate | 18 |
| Calcium carbonate | 177 |
| Titanium dioxide | 9 |
| Red pigment | 1 |
| Stabilizers | 3 |

The composition, while hot, is sheeted between calender rolls heated at about 275° F. to yield a pink opaque sheet. The sheet is cooled by exposure to the atmosphere and then is comminuted into granules of approximately 1/4 inch in diameter and about 0.015 inch thick. The granules are uniformly deposited upon a felted cellulosic sheet having a thickness of about 0.036 inch impregnated with about 20 percent polyvinyl acetate. The depth of the granules is approximately 0.108 inch. Composite decorative elements prepared as in Example B are deposited on the surface of the granules at approximately 18 inch intervals. The composite elements and the granules are then consolidated at a pressure of 1000 lbs. per square inch in a flat bed press wherein the pressing surface is maintained at a temperature of 330° F. to form a smooth uniform sheet of about 0.030 inch in thickness, securely bonded to the felt backing. The decorative elements imbedded in its surface are undistorted.

EXAMPLE III

A vinyl composition matrix sheet, six feet wide and 0.035 inch thick, is produced having the following composition:

| | Parts |
|---|---|
| Copolymer of vinyl chloride and vinyl acetate | 316 |
| Dioctyl phthalate | 126 |
| Asbestos fiber | 140 |
| Wood flour | 30 |
| Dry ground limestone | 100 |
| Silica flour | 215 |
| Stearic acid | 2 |
| Basic lead silicate | 6 |
| Titanium dioxide | 50 |
| Chrome green | 15 |

Composite decorative elements prepared as in Example B are deposited on the surface of the matrix sheet at intervals of nine inches. The matrix carrying the composite decorative elements on its surface is passed beneath a bank of infrared heating lamps which raise the temperature of the sheet to about 350° F. The heated sheet is then fed at a rate of 25 feet per minute between two steel rolls having diameters of 24 inches, the top roll contacting the composite decorative elements and the surface of the matrix sheet has a polished chrome surface and is maintained at 275° F. The roll contacting the back of the matrix sheet is maintained at a temperature of 195° F. The rolls are adjusted so that the sheet upon passing from the rolls has a thickness of about 0.025 inch. The sheet thus produced is allowed to travel with its surface in inherent contact with the surface of the chrome roll for approximately one-half revolution at which point it is stripped from the roll. The sheet is then passed over cooling rolls to reduce its temperature to about 100° F. and then laminated to a bituminum impregnated felt of about 0.036 inch in thickness and having an adhesive coating on its surface. The decorative sheet produced has a smooth glossy surface with the decorative elements, having their original shape, firmly imbedded in the surface of the sheet.

Any departure from the foregoing description which conforms to the invention is intended to be included within the scope of the claims.

What is claimed is:

1. In a method for producing a smooth decorative vinyl sheet for use as a surface covering comprising distributing decorative elements of vinyl composition in spaced relationship on the surface of a layer of vinyl composition granules, said elements contrasting in appearance with said granular layer, and thereafter consolidating said decorative elements and said granules together by the application of heat and pressure to form said surface covering having said decorative elements embedded in its surface, the improvement which comprises utilizing as said decorative elements composite decorative elements resistant to distortion during said consolidating comprising a printed woven fabric laminated between thin transparent vinyl films, said fabric having a tensile strength of at least 3,000 pounds per square inch.

2. In a method for producing a smooth vinyl chloride sheet for use as a surface covering comprising distributing decorative elements of vinyl composition in spaced relationship on the surface of a layer of vinyl chloride composition granules, said elements contrasting in appearance with said granular layer, and thereafter consolidating said decorative elements and said granules together by the application of heat and pressure to form said surface covering having said decorative elements embedded in its surface, the improvement which comprises utilizing as said decorative elements composite decorative elements resistant to distortion during said consolidating comprising a thin transparent vinyl chloride film laminated to a printed woven fabric impregnated with a vinyl composition, said fabric having a tensile strength of at least 3,000 pounds per square inch.

3. In a method for producing a smooth thermoplastic composition sheet for use as a surface covering which comprises distributing compatible thermoplastic composition decorative elements in spaced relationship on the surface of a thin layer of thermoplastic composition granules, said elements contrasting in appearance with said granular layer, and thereafter consolidating said decorative elements and said composition granules together by the application of heat and pressure to form said surface covering having said decorative elements embedded in its surface, the improvement which comprises utilizing as said decorative elements a composite element resistant to distortion during said consolidating having a fabric interlayer covered on both surfaces with a thin layer of compatible thermoplastic composition, said fabric having a tensile strength of at least 3,000 pounds per square inch.

(References on following page)

References Cited by the Examiner

UNITED STATES PATENTS

| | | | |
|---|---|---|---|
| 781,378 | 1/1905 | Staeding | 156—297 |
| 1,765,589 | 6/1930 | Jackson | 154—49 |
| 2,311,044 | 2/1943 | Gans | 154—26 |
| 2,775,994 | 1/1957 | Rowe | 154—25 XR |
| 2,880,464 | 4/1959 | Benedict et al. | 18—48.8 |
| 2,905,580 | 9/1959 | Kreier. | |
| 2,986,198 | 5/1961 | Kolker et al. | 154—49 |
| 3,078,510 | 2/1963 | Rowe | 154—49 |

ALEXANDER WYMAN, *Primary Examiner.*

EARL M. BERGERT, CARL F. KRAFFT, *Examiners.*